(12) United States Patent
Remboski et al.

(10) Patent No.: US 11,923,755 B2
(45) Date of Patent: Mar. 5, 2024

(54) LUBRICANT SUPPORTED ELECTRIC MOTOR INCLUDING A BEARING STRUCTURE

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE); Bruno Lequesne, Menomonee Falls, WI (US)

(73) Assignee: Neapco Intellectual Property Holdings, LLC, Farmington Hills, MI (US)

( * ) Notice: Subject to any disclaimer, the term of this patent is extended or adjusted under 35 U.S.C. 154(b) by 123 days.

(21) Appl. No.: 17/065,800

(22) Filed: Oct. 8, 2020

(65) Prior Publication Data

US 2021/0104937 A1    Apr. 8, 2021

Related U.S. Application Data

(60) Provisional application No. 62/912,130, filed on Oct. 8, 2019.

(51) Int. Cl.
*H02K 9/193* (2006.01)
*H02K 5/167* (2006.01)
*H02K 7/08* (2006.01)

(52) U.S. Cl.
CPC .......... *H02K 9/193* (2013.01); *H02K 5/1677* (2013.01); *H02K 7/088* (2013.01)

(58) Field of Classification Search
CPC ............ H02K 1/20; H02K 9/19; H02K 9/193; H02K 5/18; H02K 5/20; H02K 15/03; H02K 2201/03
USPC ....... 310/54, 64, 216.033, 216.039, 216.043, 310/216.049, 216.051, 216.054, 216.055, 310/216.056, 216.064, 90
See application file for complete search history.

(56) References Cited

U.S. PATENT DOCUMENTS 3,439,202 A * 4/1969 Wanke ..................... H02K 9/10
310/58
5,497,040 A * 3/1996 Sato ..................... H02K 1/2786
310/67 R (Continued)

FOREIGN PATENT DOCUMENTS

EP      3522335 A1 *  8/2019
JP    H05111212 A     4/1993

(Continued)

*Primary Examiner* — John K Kim
(74) *Attorney, Agent, or Firm* — Dickinson Wright PLLC

(57) ABSTRACT

A lubricant supported electric motor includes a stator presenting a stator raceway, and a rotor movable relative to the stator about an axis. The rotor presents a rotor raceway disposed in radially spaced and opposing relationship with the stator raceway to define a gap therebetween. A lubricant is disposed in the gap for supporting the rotor relative to the stator. The stator raceway includes a bearing structure comprised of a plurality of hydrodynamic surfaces aligned in parallel relationship along the stator raceway and a plurality of hydrostatic pockets disposed in radially recessed relationship relative to the hydrodynamic surfaces.

13 Claims, 8 Drawing Sheets

(56) References Cited

U.S. PATENT DOCUMENTS

| | | | | |
|---|---|---|---|---|
| 9,013,086 | B2* | 4/2015 | Dokonal | H02K 1/187 310/216.057 |
| 2004/0027018 | A1* | 2/2004 | LeBlanc | H02K 7/085 310/90 |
| 2004/0212921 | A1* | 10/2004 | Herndon | F16C 33/1085 310/90 |
| 2006/0158052 | A1* | 7/2006 | Yamamoto | F16C 33/103 310/90 |
| 2008/0309183 | A1* | 12/2008 | Murakami | F16C 17/107 384/42 |
| 2009/0256442 | A1* | 10/2009 | Stiesdal | F03D 9/25 310/90 |
| 2010/0007225 | A1* | 1/2010 | Platon | H02K 1/2793 29/598 |
| 2010/0194220 | A1* | 8/2010 | Tatematsu | H02K 1/32 310/61 |
| 2010/0225183 | A1* | 9/2010 | Baik | H02K 55/04 310/58 |
| 2011/0133580 | A1* | 6/2011 | Sugimoto | B60L 15/20 310/54 |
| 2012/0112569 | A1* | 5/2012 | Le Besnerais | H02K 5/20 29/596 |
| 2013/0235489 | A1* | 9/2013 | Aoshima | F16C 32/0666 384/123 |
| 2014/0056726 | A1* | 2/2014 | Garrard | H02P 29/40 417/372 |
| 2015/0179212 | A1* | 6/2015 | Sugi | F16C 33/74 310/90 |
| 2015/0249379 | A1* | 9/2015 | Wirsch, Jr. | H02K 5/203 310/54 |
| 2016/0172931 | A1* | 6/2016 | Teets | H02K 5/1677 310/90 |
| 2017/0169984 | A1* | 6/2017 | Tiwari | H01J 35/104 |
| 2019/0280536 | A1* | 9/2019 | Niijima | H02K 5/203 |
| 2019/0284992 | A1* | 9/2019 | Hoke | F02B 39/10 |
| 2021/0104937 | A1* | 4/2021 | Remboski | H02K 5/1677 |

FOREIGN PATENT DOCUMENTS

| | | |
|---|---|---|
| JP | H09308186 A | 11/1997 |
| JP | 4446506 B2 | 4/2010 |

* cited by examiner

US 11,923,755 B2

LUBRICANT SUPPORTED ELECTRIC MOTOR INCLUDING A BEARING STRUCTURE

CROSS-REFERENCE TO RELATED APPLICATION

The subject application claims priority to U.S. Provisional Application Ser. No. 62/912,130 filed on Oct. 8, 2019, the entire disclosure of which is incorporated herein by reference.

FIELD OF THE INVENTION

The present disclosure relates to electric devices, such as electric motors and electric generators. More particularly, the present disclosure relates to a lubricant supported electric motor.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement for the traditional ICE prime mover that distributes the prime mover function to each or some of the plurality of wheels via one or more motors disposed on, within, or proximate to the plurality of wheels. For example, in one instance, a traction motor, using a central shaft through a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, the disclosure of which is incorporated herein by reference, can be utilized as the "on wheel", "in wheel" or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel" or "near wheel" configuration still results in motors that are too heavy and not robust enough to shock loading to be useful for wheel-end applications. These traction motors also must be supported by rolling element bearings typically at each end of the electric motor shaft, making them too heavy and large to be practical for wheel end applications. These conventional rolling element bearings also have limited ability to sustain (absorb) large, sudden shocks and also consume significant space within the electric motor that does not contribute to torque production. Similarly, the utilization of a lubricant supported electric motors as the "on wheel", "in wheel" or "near wheel" motor in an automotive or land vehicle application results in an arrangement with some performance issues when it is subjected to the wide range of dynamic forces encountered during operation at the wide range of speeds encountered in a prime-mover application. Lubricant supported electric motors also typically do not include rotor and stator structures that are sufficiently designed to function as bearings. Thus, there remains a continuing need for a lubricant supported electric motor which improves performance during operating in high shock and vibration environments, while providing the lighter and smaller footprint sought from alternative prime mover implementations.

SUMMARY OF THE INVENTION

The subject invention is generally directed to a lubricant supported electric motor including a stator presenting a stator raceway, and a rotor movable relative to the stator about an axis. The rotor presents a rotor raceway disposed in radially spaced and opposing relationship with the stator raceway to define a gap therebetween. A lubricant is disposed in the gap for supporting the rotor relative to the stator. The stator raceway includes a bearing structure comprised of a plurality of hydrodynamic surfaces aligned in parallel relationship along the stator raceway and a plurality of hydrostatic pockets disposed in radially recessed relationship relative to the hydrodynamic surfaces. The incorporation of the bearing structure into the stator provides a lubricant supported electric motor with improved rotor-to-stator system stiffness to allow the lubricant supported electric motor to be used in high shock and high vibration environments, such as transportation and manufacturing, albeit with a design that is light and small relative to the prior electric motors. The bearing structure also results in higher efficiency for the lubricant supported electric motor relative to prior designs. Other advantages will be appreciated in view of the following more detailed description of the subject invention.

BRIEF DESCRIPTION OF THE DRAWINGS

The drawings described herein are for illustrative purposes only of selected aspects and not all possible implementations, and are not intended to limit the scope of the present disclosure.

DETAILED DESCRIPTION OF THE ENABLING EMBODIMENTS

Example embodiments of a lubricant supported electric motor in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
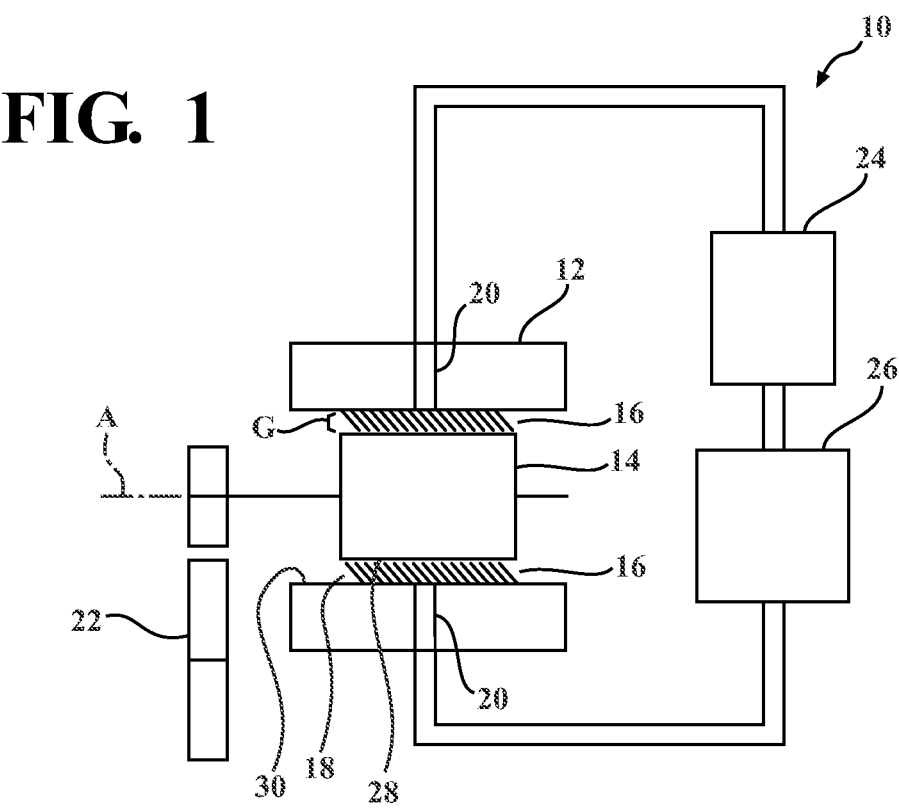
FIG. 1 is a cross-sectional side view of an exemplary lubricant supported electric motor illustrating a rotor extending along an axis and rotatably disposed within a stator to define a gap therebetween and a lubricant disposed within the gap for supporting the rotor within the stator.
Figure 2:
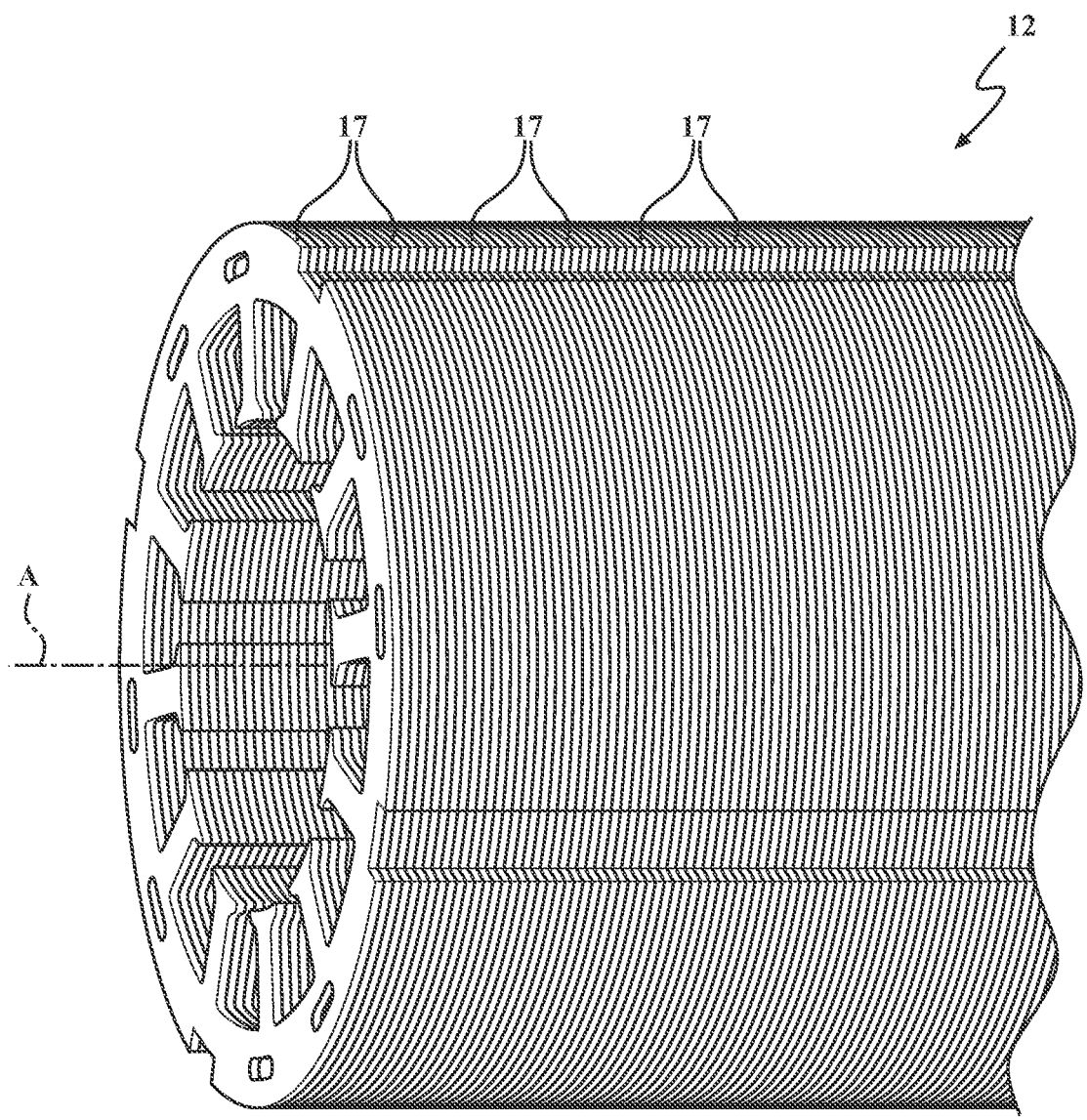
FIG. 2 is a perspective view of the exemplary stator of FIG. 1 formed from a plurality of stator laminations stacked on one another along the axis.
Figure 3:
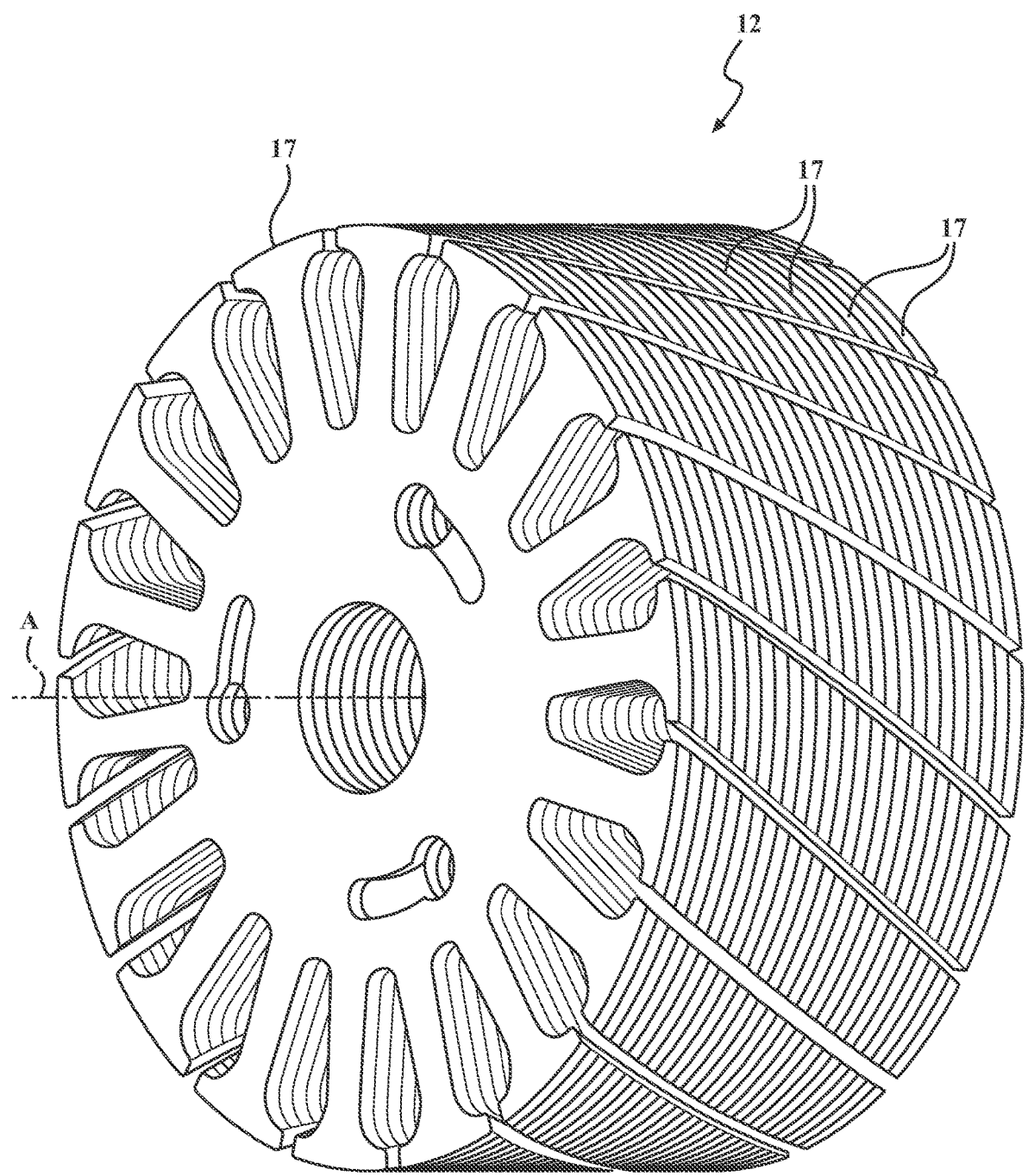
FIG. 3 is a perspective view of an alternative arrangement of the stator for implementation in a reversed arrangement of the lubricant supported electric motor in which the stator extends along the axis and the rotor is to be disposed rotatably around the stator.

FIGS. 1 and 4-11 illustrate a lubricant supported electric motor 10 in accordance with an aspect of the disclosure. As best illustrated in FIG. 1, the lubricant supported electric motor 10 includes a stator 12 and a rotor 14 extending along an axis A and movably (i.e., rotatably) disposed within the stator 12 to define a gap 16 (also shown as "G" in FIG. 1) therebetween. (See also FIGS. 7-8 and 11). In an alternative arrangement, the stator 12 and the rotor 14 can be reversed, with the stator 12 extending along the axis A and the rotor 14 rotatably disposed around the stator 12 without departing from the scope of the subject disclosure. (See e.g., FIGS. 3-6 and 10). In either arrangement, and as best illustrated in FIGS. 2-3, the stator 12 is formed from a plurality of stator laminations 17 stacked upon one another along the axis A.

A lubricant 18 is disposed in the gap 16 for supporting the rotor 14 within or around the stator 12, and providing continuous contact between these components. The lubricant 18 may therefore act as a buffer (e.g., suspension) between the stator 12 and the rotor 14 minimizing or preventing contact therebetween. In other words, the lubricant 18 prevents direct contact between the stator 12 and rotor 14 and provides an electric lubricant supported electric motor 10 which is robust to shock and vibration loading due to the presence of the lubricant 18. Additionally, and alternatively, a substantially incompressible lubricant 18 may be used in order to minimize the gap between the stator 12 and rotor 14.

As further illustrated FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, a high pressure source (e.g., a pump) 24 of the lubricant 18 may be fluidly coupled to a low pressure source (e.g., a sump) 26 of the lubricant 18, where the lubricant 18 may move from the lower pressure source to the high pressure source, through the passageway 20 and into the gap 16. Rotation of the rotor 14 relative to the stator 12 may operate as a self-pump to drive lubricant 18 through the passageway 20 and into the gap 16.

As further illustrated in FIG. 1, the rotor 14 is preferably interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. However, the rotor 14 could be directly coupled to the wheel of the vehicle, without departing from the scope of the subject disclosure. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 22 may provide one or more reduction ratios between the lubricant supported electric motor 10 and the wheel in response to movement of the rotor 14.

As best illustrated in FIGS. 1 and 4-8, the rotor 14 presents a rotor raceway 28 (arranged as an inner raceway in FIGS. 1 and 7-8) and the stator 12 presents an stator raceway 30 (arranged as an outer raceway in FIGS. 1 and 7-8) disposed in opposing relationship to the rotor raceway 28. However, when the arrangement of the stator 12 and the rotor 14 relative to the axis A are reversed, the respective raceways 28, 30 similarly swap, with the stator raceway 30 arranged as the inner raceway and the rotor raceway 28 arranged as the outer raceway. (See FIGS. 4-6). In either arrangement, and as best illustrated in FIGS. 4-8, the stator raceway 30 includes a bearing structure 32 comprised of a plurality of hydrodynamic surfaces 34 each disposed in axially spaced relationship with one another and circumferentially aligned along the stator raceway 30 in parallel relationship to the axis A. In other words, each of the hydrodynamic surfaces 34 extend circumferentially along the stator raceway 30 and are disposed in radially spaced relationship with adjacent ones of the plurality of hydrodynamic surfaces 34.

Figure 12:
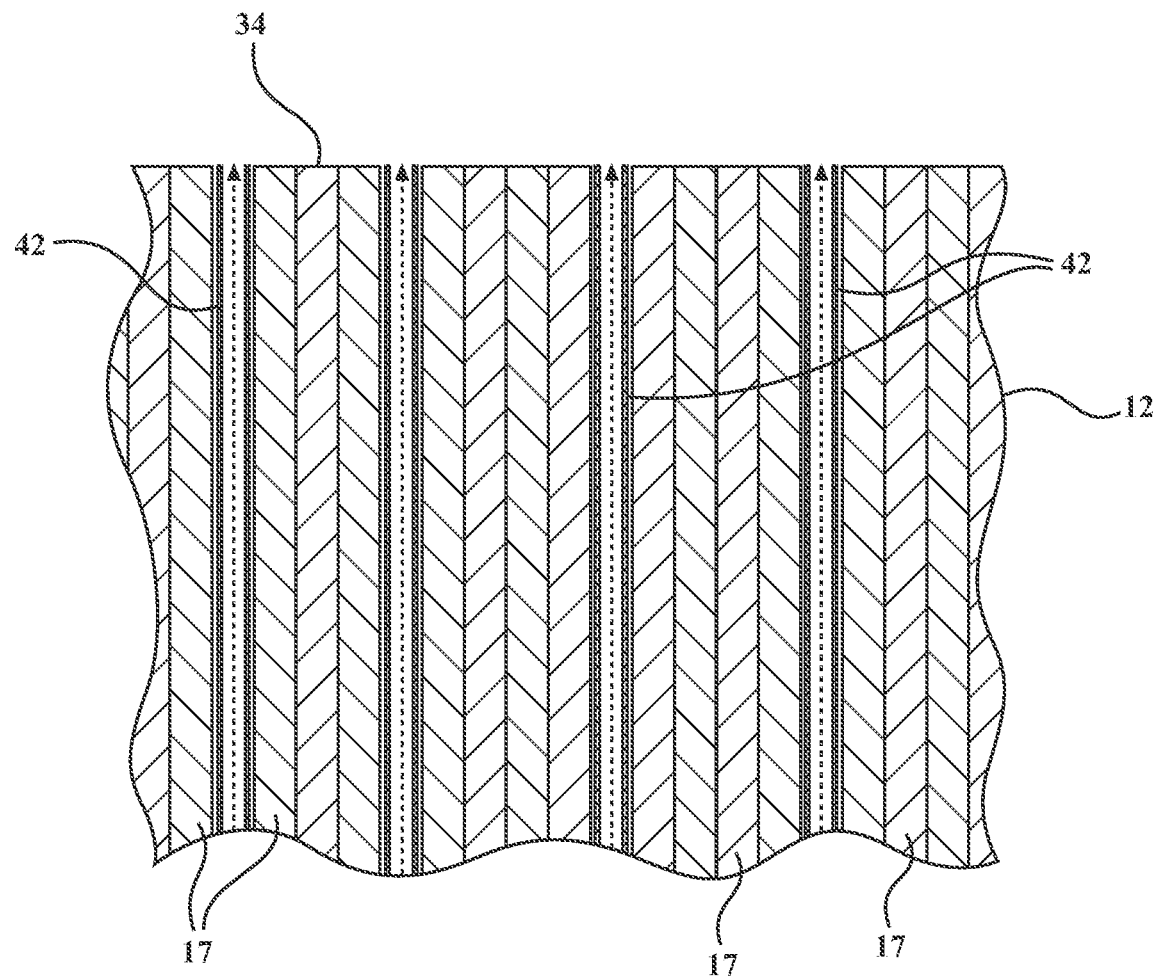
FIG. 12 is a magnified cross-sectional view of the stator laminations forming the hydrodynamic surface illustrating a plurality of lubricant supply tubes passing between adjacent stator laminations.

The bearing structure 32 of the stator 12 also defines a plurality of hydrostatic pockets 36', 36" extending circumferentially along the stator raceway 30 in radially recessed relationship relative to the hydrodynamic surfaces 34, with each of the plurality of hydrostatic pockets 36', 36" disposed axially between a pair of respective ones of the plurality of hydrodynamic surfaces 34. In a preferred arrangement, each of the plurality of hydrostatic pockets 36', 36" are rectangular shaped, however other shapes could be utilized without departing from the scope of the subject disclosure. The plurality of hydrostatic pockets 36', 36" include a first set of hydrostatic pockets 36' extending along the stator raceway 30 in circumferentially spaced relationship to one another adjacent a first end 38 of the stator 12 and a second set of hydrostatic pockets 36" extending along the stator raceway 30 in circumferentially spaced relationship to one another adjacent a second end 40 of the stator 12. However, additional sets of hydrostatic pockets 36', 36" could be utilized without departing from the scope of the subject disclosure. As illustrated in FIGS. 4-8, the stator includes a plurality of lubricant supply tubes 42 disposed in fluid communication with each set of hydrostatic pockets 36', 36" for delivering lubricant 18 to the hydrostatic pockets 36', 36" and then consecutively to the hydrodynamic surfaces 34. As illustrated in FIG. 12, the lubricant supply tubes 42 preferably pass between adjacent stator laminations 17. However, the lubricant supply tubes 42 could alternatively pass through stator winding areas as package space allows.

As further illustrated in FIGS. 4-8, the bearing structure 32 of the stator 12 includes a drain gutter 44 radially recessed from the hydrodynamic surfaces 34 and extending circumferentially along the stator raceway 30 in axially spaced relationship between the first and second sets of hydrostatic pockets 36', 36". The drain gutter 44 is preferably arranged central to the stator raceway 30 and designed to capture lubricant 18 from the hydrodynamic surfaces 34 and initiate a low pressure return/drain of the lubricant 18 through the stator 12 to the sump 26. Thus, the stator 12 also includes a lubricant return tube 46 disposed in fluid communication with the drain gutter 44, also preferably arranged and passing between adjacent stator laminations 17 (See FIG. 12).

Figure 4:
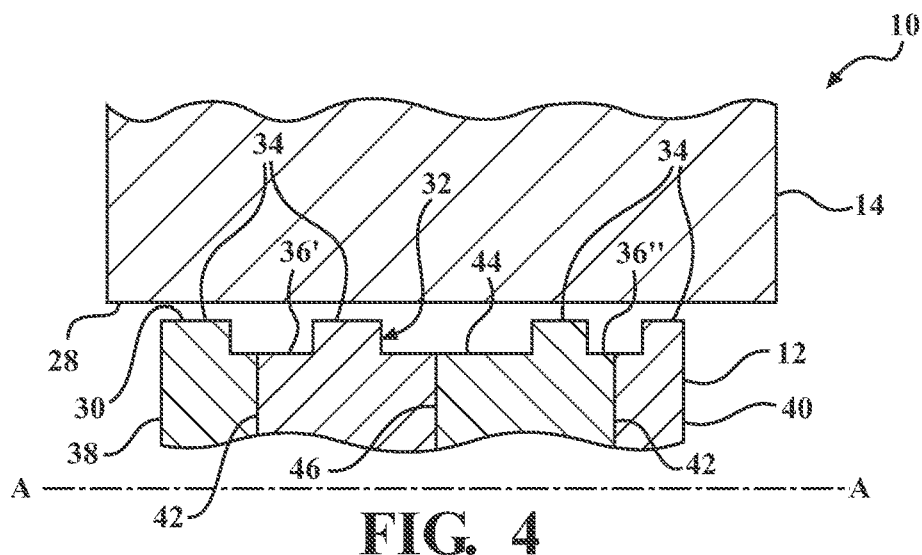
FIG. 4 is a cross-sectional side view of the lubricant supported electric motor illustrating a bearing structure provided on an inner stator raceway of the stator.
Figure 5:
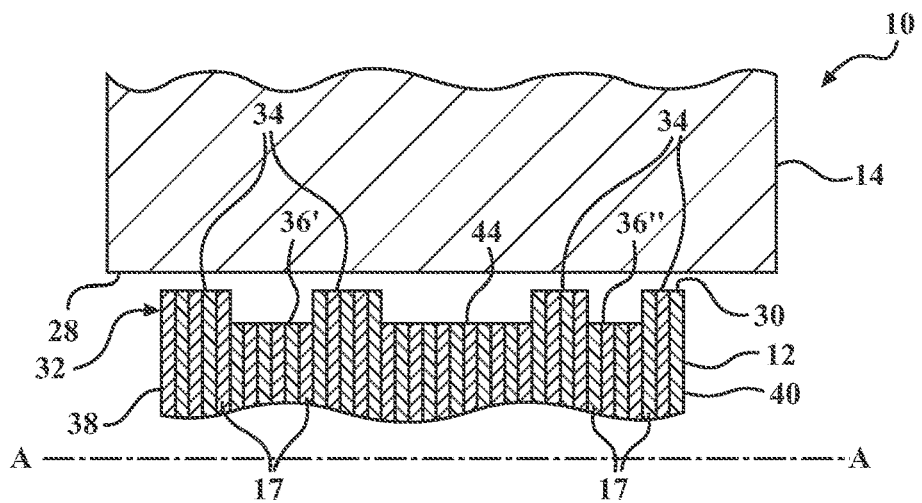
FIG. 5 is a cross-sectional side view of the lubricant supported electric motor of FIG. 4 illustrating the bearing structure formed from a plurality of stator laminations.
Figure 6:
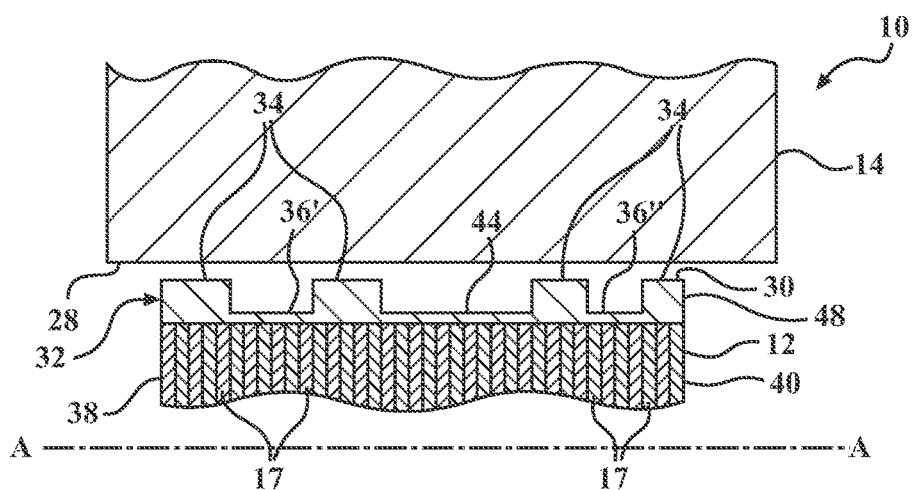
FIG. 6 is a cross-sectional side view of the lubricant supported electric motor of FIG. 4 illustrating the bearing structure formed from a continuous sleeve disposed axially around the stator laminations between a first stator end and a second stator end.
Figure 7:
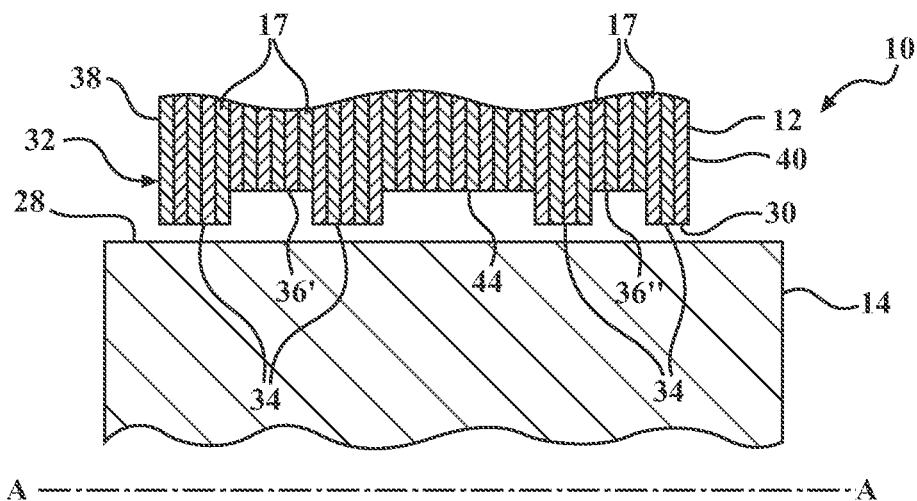
FIG. 7 is cross-sectional side view of the lubricant supported electric motor illustrating the bearing structure provided on an outer stator raceway of the stator and formed from the plurality of stator laminations.
Figure 8:
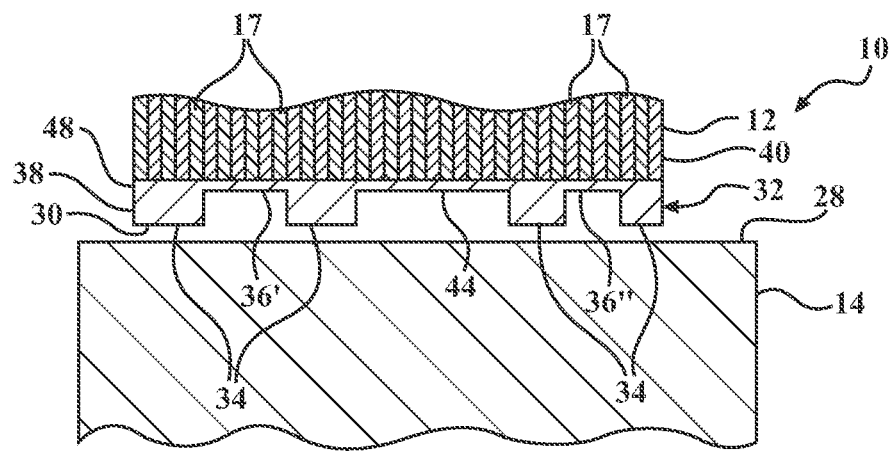
FIG. 8 is a cross-sectional side view of the lubricant supported electric motor illustrating the bearing structure provided on the outer stator raceway of the stator and formed from the continuous sleeve.
Figure 9:
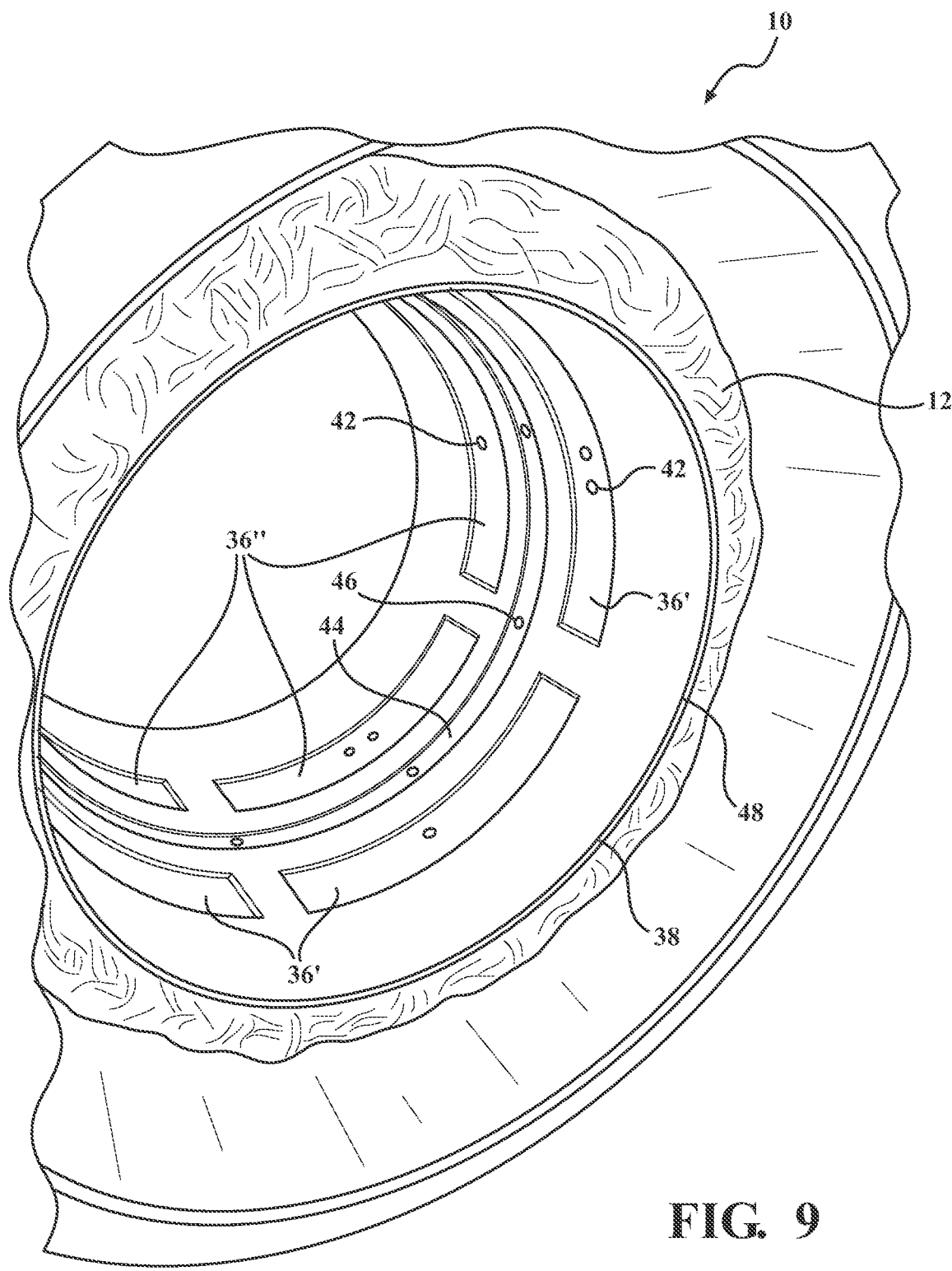
FIG. 9 is perspective side view of the stator of FIG. 8 more clearly illustrating the continuous sleeve extending from the first stator end to the second stator end.

As illustrated in FIGS. 4-6, when the stator 12 is arranged along the axis A, the bearing structure 32 is arranged along the stator's inner raceway 30. However, as illustrated in FIGS. 7-9, when the arrangement of the stator 12 and the rotor 14 relative to the axis A are reversed, and the rotor 14 is arranged along the axis A, the bearing structure 32 is arranged along the stator's outer raceway 30. In either arrangement, the bearing structure 32 can be formed in a number of ways, such as but not limited to the following exemplary implementations.

According to an aspect of the disclosure, the bearing structure 32 can be formed from the stator laminations 17 itself. More specifically, either an outer diameter of the stator laminations (such as shown in FIG. 5) or an inner diameter of the stator laminations (such as shown in FIG. 7 can be machined to form the hydrodynamic surfaces 34, hydrodynamic pockets 36' 36" and the drain gutter 44. Certain groups of the stator laminations 17 are machined to reduce an overall diameter of the stator laminations relative to adjacent ones of the stator laminations, and thus create the recessed areas which form the hydrostatic pockets 36' 36" and the drain gutter 44. The remaining stator laminations 17 can be finish machined sufficient to produce a smooth hydrodynamic bearing surface 34 (e.g., Ra (roughness average) of less than 0.4 microns) with no sharp edges. The lamination surface machining is sufficiently thin to minimize eddy current losses therein. Alternatively, in lieu of finish machining these surfaces, a thin veneer of bearing material (e.g., rings or strips) can be placed on the hydrodynamic surfaces 34 and secured to the respective stator laminations 17 via adhesive or the like.

According to another aspect of the disclosure, and as best illustrated in FIGS. 6 and 8, the bearing structure 32 can be formed by placing and disposing a continuous sleeve 48 over the stator laminations 17 between the first and second ends 38, 40 of the stator 12. In this arrangement, the stacked stator laminations 17 form a continuous inner or outer surface (See e.g., FIGS. 2-3) onto which the continuous sleeve 48 is placed to form the hydrodynamic surfaces 34, hydrostatic pockets 36, 36" and the drain gutter 44. FIG. 9 illustrates a perspective view of the continuous sleeve 48 arranged along the staor outer raceway 30. The continuous sleeve 38 can be fixed to the stator laminations 17 using a number of methods including, but not limited to, a pressed interference fit, a shrink interference fit, adhesives, or mechanical features such as ribs or splines.

Similar to the method of forming the stator 12, the structure of the rotor 14 can also be formed in a number of similar ways. For example, the inner or outer rotor raceway 28 can be formed with finish machining to produce a smooth bearing surface (e.g., Ra of less than 0.4 microns). Alternatively, the inner or outer rotor raceway 28 can be formed from a thin veneer of bearing material (e.g., rings or strips) that is retained by adhesives. Additionally, the inner or outer rotor raceway 28 can be formed from a continuous rotor sleeve that is fixed to the rotor 14 using a number of methods including: a pressed interference fit, a shrink interference fit, adhesives, or mechanical features such as ribs or splines. The continuous rotor sleeve can also provide mechanical support for integrity of the rotor 14, for example in situations of high speed of the lubricant supported electric motor 10 where large, outward-directed forces can take place on the structure of the rotor 14. This configuration can be particularly useful for magnet retention when the lubricant supported electric motor 10 is of the permanent magnet brushless type, generally for lamination support of the rotor 14, and also for squirrel-cage robustness for induction machines. According to an aspect of the disclosure, some lubricant supported electric motors 10 have solid rotors 14 (e.g., special induction machines), the surface of which can work directly as a bearing surface.

Figure 10:
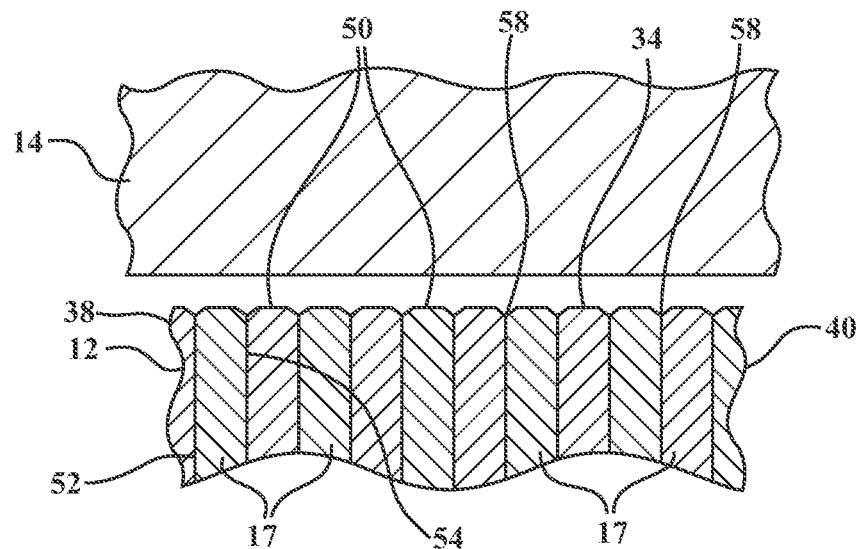
FIG. 10 is a magnified cross-sectional view of a portion of FIG. 5 illustrating each of the plurality of stator laminations forming the hydrodynamic surfaces having a circumferential outer edge being beveled on both a first edge side disposed facing the first stator end and a second edge side disposed facing the second stator end to define a plurality of lubricant relief channels.
Figure 11:
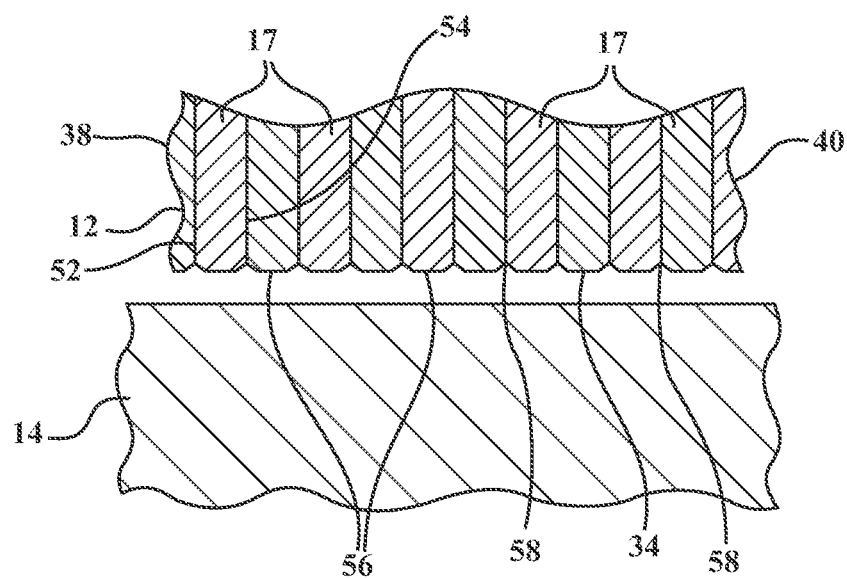
FIG. 11 is a magnified cross-sectional view of a portion of FIG. 7 illustrating each of the plurality of stator laminations forming the hydrodynamic surfaces having a circumferential inner edge being beveled on both the first edge side disposed facing the first stator end and the second edge side disposed facing the second stator end to define a plurality of lubricant relief channels.

FIGS. 10-11 illustrate a magnified cross-sectional view of the hydrodynamic surface 34 formed by the inner or outer diameters of the stator laminations 17. As illustrated in FIG. 10, when the rotor 14 is rotably disposed around the stator 12, each of the stator laminations 17 which form the hydrodynamic surfaces 34 can include an circumferential outer edge 50 which is beveled on both a first edge side 52 disposed facing the first end 38 of the stator 12 and a second edge side 54 disposed facing the second end 40 of the stator 12. Alternatively, as illustrated in FIG. 11, when the rotor 14 is arranged along the axis A, each of the stator laminations 17 which form the hydrodynamic surfaces 34 can include a circumferential inner edge 56 which is similarly beveled on both a first edge side 52 disposed facing the first end of the stator 12 and a second edge side 54 disposed facing the second end of the stator 12. The beveled circumferential outer or inner edges 50, 56 advantageously incorporates lubricant flow features into the hydrodynamic surfaces 34 of the bearing structure 32, forming slightly recessed lubricant relief channels 58 disposed between each adjacent stator lamination 17 that can allow correct lubricant flow to improve bearing performance and stability. The relief channels 58 formed between stator laminations 17 can be connected to lubricant conduction channels and to lubricant flow controlling equipment.

Additionally and alternatively, the stack of stator laminations 17 can include stator laminations of slightly different diameters, such that one stator lamination every other or every third lamination (generally, one or more stator lamination in "n") is slightly recessed (larger inner diameter) than the other laminations. The stator laminations with the smaller inner diameter are ground to form the hydrodynamic surface 34, and the stator laminations with the larger inner diameter are not, thus forming recesses or "relief areas" once every "n" laminations.

The bearing structure 32 in accordance with the subject disclosure advantageously allows for a number of bearing control configurations and methods not provided by the prior art lubricant supported electric motors. For example, the bearing structure 32 provides for increased bearing stiffness by pumping more lubricant 18 to the hydrodynamic surfaces 34 through the radial lubricant supply tubes 46 and relief channels 58. For example, this configuration and method can be used to minimize the effects of critical speed resonances in the rotor 14 and stator 12 of the lubricant supported electric motor 10. Additionally, decreased bearing shear loss can be provided by reducing the pressure in the hydrodynamic surfaces 34 by allowing lubricant flow out of the hydrodynamic surfaces 34 through the relief channels 58 and the lubricant supply and return tubes 42,44. Both of these effects may be further controlled by increasing or decreasing bearing pressure radially around the bearing structure 32 or axially along the bearing structure 32. Additionally, thermal control of the hydrodynamic surfaces 32 can be further controlled on a segment-by-segment basis.

According to an aspect of the disclosure, the stator laminations 17 preferably include the following characteristics, features, and supports. The stator laminations 17 include efficient magnetic flux conduction, similar to current in electric motor windings. The stator laminations 17 also include mechanical stiffness in the radial direction to accommodate bearing loads without buckling of the stator laminations 17. The stator laminations 17 also include stator slot clearance for windings and lubricant flow. The stator laminations 17 further include stator tooth width for lubricant passages as well as lamination bonding to provide electrical insulation between and mechanical adhesion of stator laminations. The stator laminations 17 also preferably include mechanical structures to create compression of lamination stacks (e.g., stator housings, rotor hubs, weldments, and through-pins), as well as inner diameter variations to create shoulders for holding bearing rings, bearing sleeves, hydrostatic pocket liners, and drain gutter liners, for example.

The advantages detailed herein to the improvement in lubricant supported electric motors include higher levels of efficiency, stiff and stable bearing structures to support rotors of the lubricant supported electric motors, and support capable of withstanding high impacts (shocks). Additional advantages include space-saving (compactness) and generous cooling of the electric motor windings (by the lubricant), to improve the torque density of the lubricant supported electric motor 10 (i.e., torque per volume).

Obviously, many modifications and variations of the present disclosure are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A lubricant supported electric motor comprising:
    a stator presenting a stator raceway;
    a rotor movable relative to said stator about an axis and presenting a rotor raceway disposed in radially spaced and opposing relationship with said stator raceway to define a gap therebetween;
    said stator raceway including a bearing structure comprised of a plurality of hydrodynamic surfaces aligned in parallel relationship along said stator raceway and a plurality of hydrostatic pockets disposed in radially recessed relationship relative to said plurality of hydrodynamic surfaces;
    a plurality of lubricant supply tubes disposed in fluid communication with said plurality of hydrostatic pockets to deliver a lubricant to said plurality of hydrodynamic pockets and then consecutively to said plurality of hydrodynamic surfaces and said gap for establishing support of said rotor relative to said stator; and
    said stator including a drain gutter arranged central to said stator raceway and disposed in radially recessed relationship relative to said plurality of hydrodynamic surfaces and extending circumferentially along said stator raceway in axially spaced relationship with said plurality of hydrostatic pockets.

2. The lubricant supported electric motor as set forth in claim 1, wherein said plurality of hydrodynamic surfaces are each disposed in axially spaced relationship with one another and each of said plurality of hydrostatic pockets are disposed axially between a pair of adjacent ones of said plurality of hydrodynamic surfaces.

3. The lubricant supported electric motor as set forth in claim 2, wherein said stator extends axially from a first stator end to a second stator end, and said plurality of hydrostatic pockets include a first set of hydrostatic pockets extending in circumferentially spaced and aligned relationship adjacent said first stator end and a second set of hydrostatic pockets extending in circumferentially spaced and aligned relationship adjacent said second stator end.

4. The lubricant supported electric motor as set forth in claim 3, wherein said drain gutter is disposed between said first and second sets of hydrostatic pockets.

5. The lubricant supported electric motor as set forth in claim 1, wherein said stator includes at least one lubricant return tube disposed in fluid communication with said drain gutter.

6. The lubricant supported electric motor as set forth in claim 5, wherein said stator is comprised of a plurality of stator laminations stacked upon one another along the axis, and each of said plurality of lubricant supply tubes and said at least one lubricant return tube pass between adjacent ones of said stacked stator laminations.

7. The lubricant supported electric motor as set forth in claim 6, wherein an inner or outer diameter of said stacked stator laminations is machined to form said plurality of hydrodynamic surfaces, said plurality of hydrostatic pockets and said drain gutter.

8. The lubricant supported electric motor as set forth in claim 7, wherein each of said stator laminations collectively defining said plurality of hydrodynamic surfaces includes a circumferential edge being beveled on both a first edge side disposed facing said first end of said stator and a second edge side disposed facing said second end of said stator to form a lubricant relief channel disposed between adjacent first and second beveled side edges of each stator laminations forming said plurality of hydrodynamic surfaces.

9. The lubricant supported electric motor as set forth in claim 5, wherein said stator includes a continuous sleeve disposed over and circumferentially around said stator laminations between said first and second stator ends to form said bearing structure.

10. The lubricant supported electric motor as set forth in claim 1, wherein said rotor extends along the axis and is rotatably disposed within said stator.

11. The lubricant supported electric motor as set forth in claim 1, wherein said stator extends along the axis and said rotor is rotatably disposed around said stator.

12. The lubricant supported electric motor as set forth in claim 1, wherein said rotor is operably interconnected with a wheel of a vehicle.

13. The lubricant supported electric motor as set forth in claim 1, wherein each of said plurality of hydrostatic pockets comprises a rectangular cross-sectional shape.

\* \* \* \* \*